PHASE SHIFTING CIRCUITS FOR COLOR TELEVISION RECEIVERS

Filed May 23, 1966

INVENTORS.
EDWARD W. CURTIS and
THORNLEY C. JOBE
BY Kenneth R. Schaefer
Attorney INVENTORS.
EDWARD W. CURTIS and
THORNLEY C. JOBE
BY Kenneth R. Schaefer
Attorney United States Patent Office 3,454,708

Patented July 8, 1969

3,454,708
PHASE SHIFTING CIRCUITS FOR COLOR TELEVISION RECEIVERS

Edward Wesley Curtis, Indianapolis, Ind., and Thornley C. Jobe, Memphis, Tenn., assignors to RCA Corporation, a corporation of Delaware Filed May 23, 1966, Ser. No. 552,061
Int. Cl. H04n 9/46, 9/48
U.S. Cl. 178—5.4 9 Claims

ABSTRACT OF THE DISCLOSURE

In a color television receiver, a color reference oscillator is maintained in controlled phase relation with received color synchronizing bursts, the phase relation and, therefore, the hue of the reproduced image being selectable by means of a phase shifting circuit coupled to the oscillator output. The phase shifting circuit comprises the series combination of an inductance and a capacitance and a variable resistance coupled across the capacitance. Automatic chroma control (ACC) and color killer reference signals also are derived from the oscillator output.

Figure 1:
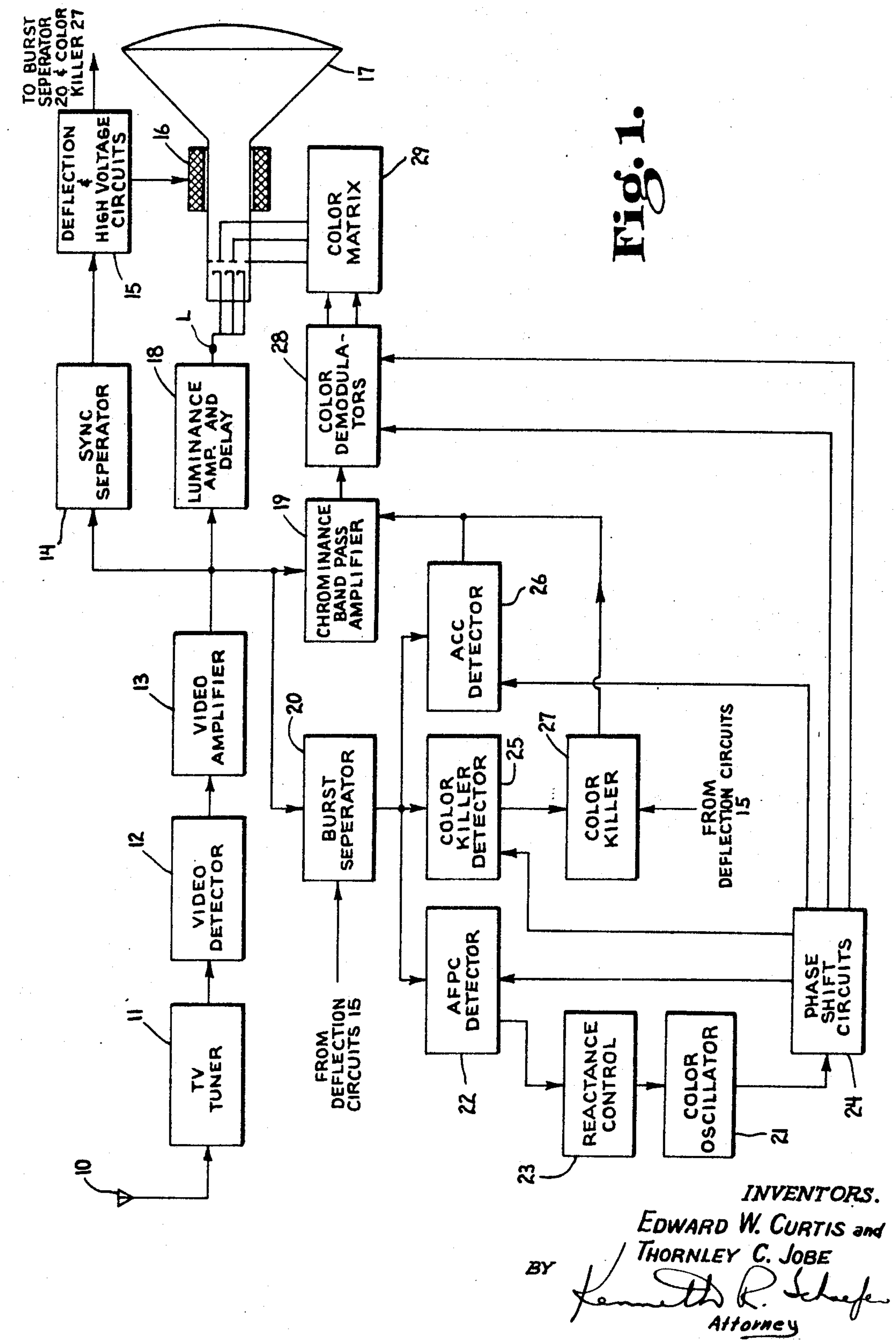

This invention relates to circuit arrangements for shifting the phase of a continuous wave and, in particular, to means for manually adjusting the hue or tint of a televised image reproduced in color.

In accordance with standards currently employed for broadcast of color television signals in the United States, color or chrominance information is provided in the broadcast signal in the form of side bands of a phase and amplitude modulated suppressed subcarrier wave. Particular "phases" of the subcarrier wave correspond to particular color components. Individual color components (or color difference signals) are derived from the modulated subcarrier wave by synchronous detection, that is, by mixing the subcarrier wave with a color reference wave at the subcarrier frequency (i.e., 3.58 mHz.) and of fixed phase relation with respect thereto, particular phase relationships being selected according to the desired color components which are to be recovered. Phase relationships between the subcarrier and reference waves are established by reference to a color burst component, which comprises a few cycles of unmodulated color subcarrier, transmitted at the end of each line of image information. Hue or tint of the reproduced image may be varied by varying the phase relationship between the reference wave generated in the receiver and the color burst component, thereby varying the relationship between the receiver generated reference and the transmitter generated suppressed subcarrier waves. Tint adjustment is desirable to accommodate individual viewer preferences and, in some instances, to correct for transmission errors.

In certain prior tint control circuits, tint adjustment is provided by connecting a variable capacitor across one or more circuits in which the 3.58 mHz. color reference wave is generated and shifting the phase of the generated wave over a small range by varying such capacitor. A variable capacitor for such an application is relatively expensive. Moreover, since it is desirable to mount a tint control on the front panel of the receiver, but because of radiation problems at 3.58 mHz. associated with a long cable between the panel mounted control and the chassis mounted reference oscillator circuit, a relatively expensive mechanical coupling is required to make such a control convenient to the televiewer.

A second type of tint control which has been employed utilizes a resistance control to detune a circuit through which either burst or the oscillator generated reference wave is passed. This method produces the desired phase shift but also introduces a variation in the amplitude of the phase shifted wave. Such an amplitude variation is undesirable in many applications and is particularly undesirable where the amplitude variation is introduced in the burst signal, the amplitude of which is to be utilized as a reference for operation of either a color killer or automatic chrominance control (ACC) circuit.

It is an object of the present invention, therefore, to provide a phase shifting circuit suitable for use as a tint control in a color television receiver wherein at a given frequency the total impedance of the phase shifting circuit remains relatively constant as the phase shift provided by such circuit is varied.

It is a further object of the present invention to provide, in a color television receiver, a relatively inexpensive tint control which provides a desirable range of phase shift without substantial amplitude variation of the applied signal.

It is a further object of the present invention to provide, in a color television receiver employing a reactance controlled reference wave oscillator which is locked in phase and frequency to received color burst components by means of an automatic frequency and phase control (AFPC) circuit, a relatively inexpensive tint control circuit for varying the phase of the reference wave oscillator output signal.

In accordance with the present invention, the phase of a color reference wave is shifted over a suitable angle to vary the hue or tint of the image reproduced in full color by means of a network coupled between the output of the reference wave oscillator and an automatic frequency and phase control detector. The network comprises the series combination of an inductor and a capacitor, a variable resistance being coupled across the capacitor. The impedance of the inductor at the operating frequency of the reference wave oscillator is selected substantially equal to one-half the impedance of the capacitor at that frequency.

In a preferred embodiment of the invention, the variable resistance is mounted on the front panel of the receiver at a distance from the capacitor and inductor, the resistance being coupled to such capacitor by means of a shielded cable. In such an embodiment, the capacitance of the cable is added in parallel to that of the capacitor, the value of the capacitor then being selected to meet the foregoing impedance requirements.

Figure 2:
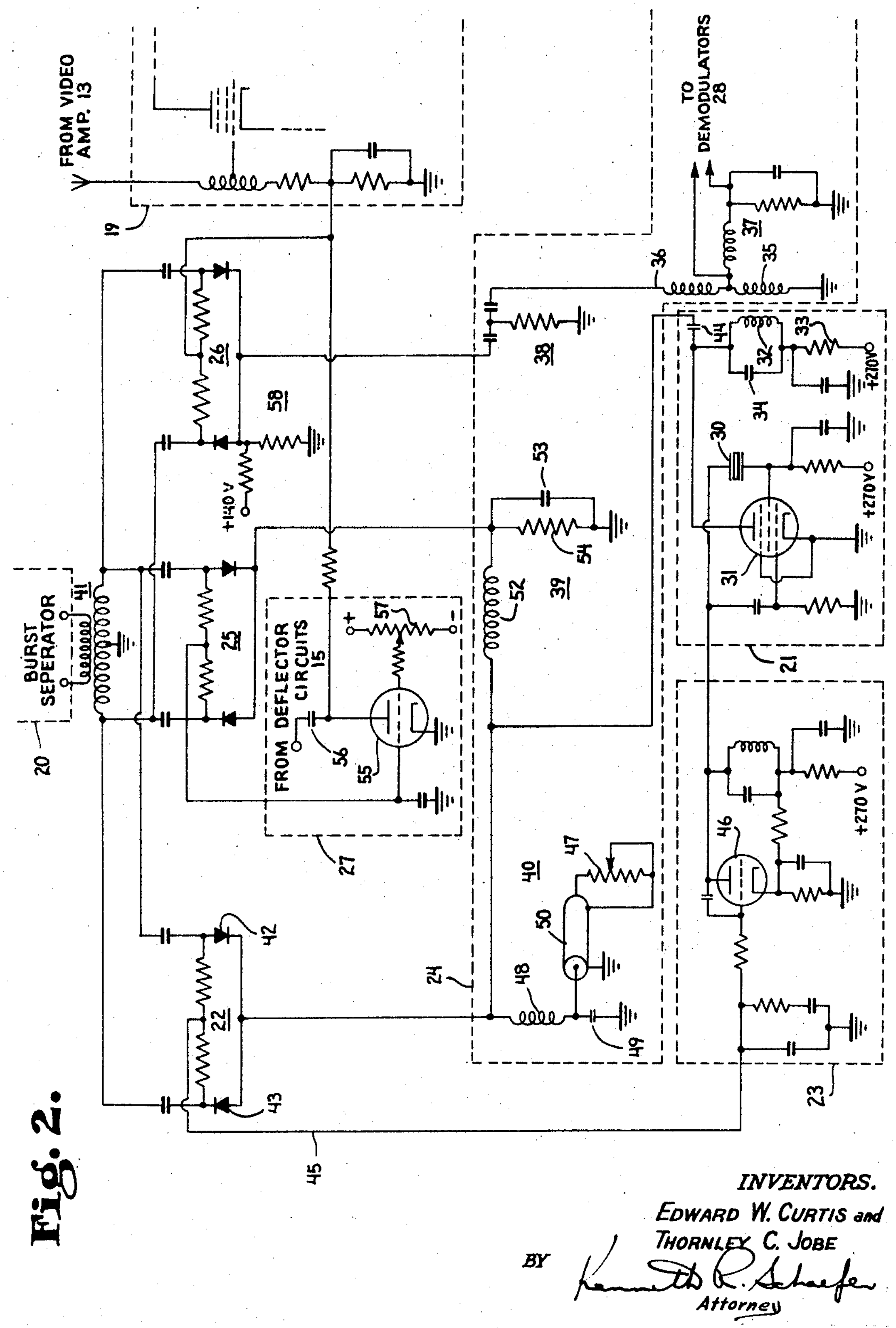

The novel features that are considered characteristic of this invention are set forth with particularity in the appended claims. The invention itself, however, both as to its organization and method of operation as well as additional objects thereof will best be understood from the following description when read in connection with the accompanying drawing in which:

FIGURE 1 is a block diagram of the image-reproducing portion of a color television receiver in which the present invention is employed; and FIGURE 2 is a schematic circuit diagram illustrating in detail portions of the block diagram of FIGURE 1, and, in particular, a tint control arrangement constructed in accordance with the present invention.

Referring to the drawing, and more particularly to FIGURE 1, a block diagram of the image-reproducing portion of a color television receiver is shown in which the present invention is employed. A carrier wave, modulated by the composite color television signal including luminance, chrominance, deflection synchronizing components and color synchronizing bursts is intercepted by an antenna 10 and is applied to a tuner section 11 which includes radio frequency amplification stages, a converter or first detector wherein the modulated carrier wave is translated in frequency to an intermediate frequency and an intermediate frequency amplifier. Amplified I-F signals are applied to a second or video detector 12.

The composite television signal which is recovered by the video detector 12 is amplified in a video amplifier stage 13 which provides various components of the composite signal simultaneously to several signal processing channels of the receiver in the following manner.

Deflection synchronizing components are supplied to a synchronizing signal separator circuit 14, the output of which is applied to deflection and high voltage generating circuits 15. Deflection circuits 15 comprise suitable means for generating sawtooth scanning waves of television line and field frequencies for application to an electromagnetic deflection yoke 16. Flyback voltage pulses produced in the horizontal or line portions of deflection circuits 15 are rectified to produce a high uni-directional voltage for application to the final anode of a color image reproducing device 17 such as the familiar three color shadow mask kinescope. The deflection circuits 15 also provide gating pulses derived from the horizontal flyback pulses for application to other portions of the television receiver as will be explained more fully below.

The luminance signal component of the composite television signal is supplied from video amplifier 13 to a delay circuit and luminance amplifier 18 which provides at its output terminal L luminance signals for application, for example, to the cathodes of kinescope 17.

The composite television signal is also supplied from video amplifier 13 to a chrominance band-pass amplifier 19 which serves to separate the subcarrier wave of chrominance signal information from the composite signal and to amplify such chrominance information.

The composite signal is also supplied from the video amplifier 13 to a burst separating amplifier 20 which also receives burst gating pulses from the deflection circuits 15. Separated color synchronizing bursts are employed in synchronizing the operation of a color reference oscillator 21 through the use of an AFPC (automatic frequency and phase control) detector arrangement 22 which provides a D-C control voltage to a reactance control circuit 23 connected in circuit with the oscillator 21 for controlling its frequency.

The output of color reference oscillator 21 is applied by means of a selected section of a phase shifting circuit 24 to AFPC detector 22 for phase and frequency comparison with the color synchronizing bursts. The particular section of phase shifting circuit 24 associated with AFPC detector 22 is constructed in accordance with the present invention to provide a variable hue or tint control as will be explained more fully below.

The output of color oscillator 21 is also applied via selected fixed value sections of phase shifting circuit 24 to a color killer detector 25 and an automatic chroma control (ACC) detector 26. The two last-named detectors 25 and 26 are also supplied with separated color synchronizing bursts from burst separator 20 to provide, respectively, threshold and gain control of band-pass amplifier 19 for the reception of color television broadcast material.

ACC detector 26 is arranged to compare the substantially constant amplitude of the reference wave output of oscillator 21 with the nominally constant amplitude of the burst component supplied by burst separator 20. On the premise that variations in burst amplitude are indicative of undesired transmission disturbances which equally affect burst and chrominance signal components, ACC detector 26 varies the gain of band-pass amplifier 19 in a compensatory manner dependent upon the detected variations in burst amplitude. Briefly stated, as burst amplitude decreases compared to the output of oscillator 21, the gain of band-pass amplifier 19 is increased to increase chrominance signal level at the output of band-pass amplifier 19. On the other hand, chrominance gain (i.e. gain of band-pass amplifier 19) is decreased as burst amplitude increases compared to the output of oscillator 21.

Killer detector 25 is arranged to provide to a killer amplifier 27 a control signal indicative of the presence or absence in the composite signal of a burst component greater than a predetermined threshold level. Killer amplifier 27, which is also supplied with gating pulses from deflection circuits 15, serves to render band-pass amplifier 19 operable or inoperable dependent upon such presence or absence of the required threshold level of burst. The "color" channel of the receiver is thereby rendered inoperative during the reception of black and white program material or during the reception of very weak signal color program material.

The output of color oscillator 21 is also applied via two additional fixed value sections of phase shifting circuit 24 to color demodulators 28, the subcarrier waves supplied to demodulators 28 being of fixed phase with respect to the phase of the reference color synchronizing bursts, the particular phase relationship being determined by the setting of a variable tint control section of phase shifting circuit 24 which was mentioned above in connection with AFPC detector 22 and will be explained in connection with FIGURE 2 below. Color difference signal outputs of color demodulators 28 are applied to color matrix circuits 29 to develop a set of color difference signal outputs suitable for application, for example, to the screen electrodes of kinescope 17 to effect reproduction, in conjunction with luminance signals provided at terminal L, of a color image on kinescope 17.

To appreciate more clearly the functioning of the phase control arrangements associated with color oscillator 21, reference should be made to the schematic diagram of FIGURE 2, in which details are shown for various elements shown in block diagram form in FIGURE 1. The remaining receiver elements may, for example, conform to the details of the corresponding elements of the RCA CTC–17X color television receiver chassis described in RCA Victor Television Service Data 1965 No. T–12, published by RCA Sales Corporation, 600 N. Sherman Drive, Indianapolis, Ind.

Referring to FIGURE 2, reference numerals identical to those employed in FIGURE 1 are used to represent corresponding elements. The color reference oscillator 21 shown is a crystal oscillator employing a crystal 30 having a resonant frequency equal to that of the color subcarrier frequency (i.e. 3.58 mHz.). The reference continuous wave output produced by an oscillator tube 31 is applied across an anode load circuit including the primary winding 32 of a transformer and a bypassed resistor 33 coupled to a positive voltage supply (+270 v.). The primary winding 32 is tuned to the subcarrier frequency by means of a capacitor 34. The transformer further includes first and second secondary windings 35 and 36. The winding 35, by virtue of its coupling with the winding 32, applies the reference wave output of oscillator 21 via fixed value sections 37 of phase shifting circuit 24 to the demodulators 28 for recovery of color information from the modulated subcarrier wave in the well known manner. The reference wave output of oscillator 21 is also applied via additional sections 38, 39, and 40 of phase shifting circuit 24 to ACC detector 26, color killer detector 25 and AFPC detector 22, respectively. At the same time, the separated and amplified color synchronizing bursts provided by burst separator 20 are applied by the transformer 41 to each of the above-named detectors 26, 25 and 22.

AFPC detector 22 comprises the serially connected diodes 42 and 43 which receive, via the center tapped secondary winding of the transformer 41, opposite phases of the separated burst information. The reference wave output of oscillator 21 is applied via a capacitor 44 (which presents a high impedance at 3.58 mHz.) across the variable tint control section 40 of phase shifting circuit 24 to the diodes 42 and 43. In the operation of AFPC detector 22, there is provided at its output lead 45 a uni-directional voltage the polarity and amplitude of which are indicative of the direction and amount by which the phase of the color reference oscillator wave provided across variable tint control section 40 varies from a 90° relationship with respect to the phase of the color synchronizing bursts. That is, the phase detector 22 provides zero output when the two waves applied to detector 22 are 90° out of phase. The uni-directional control voltage is applied via output lead 45 to the control electrode of a reactance tube 46 in the reactance control circuit 23. The reactance control circuit 23 is of known form and furnishes a reactive impedance in circuit with the crystal 30 for controlling the resonant frequency and phase of oscillator 21 in a known manner. It thus will be understood that the phase and frequency of the wave produced by the color reference oscillator 21 are accurately controlled to maintain the above-mentioned relationship between the two waves applied to AFPC detector 22. The variable tint control section 40 is operative, in accordance with the present invention, to vary the phase relationship between the color synchronizing bursts and the reference wave output of oscillator 21 produced across transformer 32 to effect a change in the operative demodulation angles of demodulators 28 and thereby effect a change in the hue or tint of the image reproduced on kinescope 17 (FIG. 1).

The variable tint control section 40 of phase shift circuit 24 is constructed in accordance with the present invention in the following manner. The series combination of an inductor 48 and a capacitor 49 is coupled to the reference wave output of oscillator 21 by means of capacitor 44. A variable resistor tint control 47 is coupled by means of a length of shielded or coaxial cable 50 across capacitor 49. The cable 50 may be of the order of one to two feet in length, i.e. sufficient to accommodate mounting of the tint control 47 on the front panel of the receiver remote from the chassis.

As was mentioned above, the capacitance of coupling capacitor 44 is chosen sufficiently small so that its reactive impedance is large at 3.58 mHz., thereby preventing any significant change in the loading and hence the operating frequency of oscillator 21 as tint control 47 is varied over its range. It readily may be seen by inspecting FIGURE 2 that when the wiper arm of tint control 47 is in its uppermost position, all of the circuit elements 47, 49 and 50 are shorted to ground. In that case, the load fed by capacitor 44 is substantially inductive (i.e. inductor 48). As the wiper of tint control 47 is moved so as to increase the resistance in the circuit, the effective capacitive reactance connected in series with inductor 48 (i.e. the sum of the capacitive reactances of capacitor 49 and cable 50 multiplied by the active resistance of control 47 and divided by the vector sum of the above-mentioned resistance and capacitive reactances) increases. In fact, if the maximum resistance of tint control 47 is very large compared to the combined capacitive reactance of elements 49 and 50, the total reactance of the combination of tint control 47, capacitor 49 and cable 50 approaches simply the capacitive reactance provided by capacitor 49 and cable 50 in parallel. It can be seen that a phase shift range of 180° could be provided by tint control 47 (i.e. from all inductive to all capacitive reactance). Since no such range is required for a practical tint control, a maximum resistance substantially smaller than infinity may be used successfully for tint control 47 (e.g. of the order of one to two thousand ohms). In accordance with the present invention, the impedance exhibited across the combination of elements 47, 48, 49 and 50 is maintained substantially constant in magnitude as tint control 47 is varied by selecting the inductive reactance of inductor 48 ($X_L$) substantially equal to one-half the effective capacitive reactance ($X_C$) of the parallel combination of capacitor 49 and cable 50 (i.e. $X_L = X_C/2$) at the operating frequency (3.58 mHz.) of oscillator 21. A vector diagram of the total impedance across phase shift section 40 as tint control 47 is varied from zero to maximum readily illustrates the desired constant impedance of $|X_C/2|$ for all settings of tint control 47. Hence the loading on oscillator 21 remains substantially constant as tint control 47 is varied.

The substantially constant level reference wave output of oscillator 21 then may be compared in killer detector 25 and ACC detector 26 with the nominally constant amplitude burst component provided at transformer 41 for threshold and gain control of band-pass amplifier 19. The fixed phase shift sections 38 and 39 (the former including secondary transformer winding 36) serve to shift the phase of the reference wave output of oscillator 21 by 90° to permit the desired amplitude comparisons. It should be noted that the reference wave provided to ACC detector 26 also may be derived from the primary winding 32. However, it was found that, under normal television viewing conditions and normally encountered variations of tint control 47, the variations in the phase of the reference wave applied to ACC detector 26 via phase shift section 38 have no significant adverse effect on the operation of ACC detector 26.

The unbalanced gain control output of ACC detector 26 is biased by means of a voltage divider source 58 to provide the required gain control characteristic for band-pass amplifier 19.

The unbalanced threshold control output of killer detector 25 is compared in killer amplifier 27 with a preset threshold level provided by variable bias control 57. Killer amplifier 27 is rendered conductive to cut off band-pass amplifier 19 whenever the output of killer detector 25 is insufficient as compared to the setting of threshold control 57 to cut off killer amplifier tube 55 (i.e. black and white or weak color signal reception). Strong color signal reception (i.e. sufficient burst level) renders killer amplifier 27 inoperative thereby permitting normal operation of band-pass amplifier 19 during reception of color program material.

It should be noted that, if necessary, a second harmonic trap circuit may be coupled across phase shift section 40 to eliminate the effect of any undesirable response to waves at twice the color reference frequency (i.e. twice 3.58 mHz.).

What is claimed is:

1. In a color television receiver adapted for reception of a composite color television signal including a phase and amplitude modulated color subcarrier component and a color synchronizing burst component providing recurring oscillations at the frequency of said subcarrier, the combination comprising an oscillator including a reference wave output terminal for generating continuous color reference oscillations at the frequency of said color subcarrier, means for separating said color synchronizing burst component from said composite signal, variable phase shifting means coupled to said output terminal of said color reference oscillator for varying the phase of said color reference oscillations, the phase of said oscillations with respect to the phase of said color burst component being determinative of the hue of the image reproduced by said receiver, said phase shifting means comprising the series combination of an inductance and a capacitance coupled to said reference wave output terminal and a variable resistance coupled across said capacitance, the impedance of said inductance being substantially equal to one-half the impedance of said capacitance at the frequency of said color reference oscillations, means coupled to said burst separating means and to said phase shifting means for producing a control signal representative of the phase relation between said burst component and said reference wave oscillations, and means for coupling said control signal to said oscillator for maintaining said reference oscillations and burst component in a phase relationship determined by said phase shifting means.

2. The combination according to claim 1 wherein said phase shifting means is coupled between said output terminal of said color reference oscillator and said means for providing a control signal, said phase shifting means being arranged to introduce a variable phase shift of said color reference oscillations with respect to said burst component dependent upon the setting of said variable resistance.

3. The combination according to claim 2 wherein said means for providing a control signal comprises a balanced phase detector for producing a correction voltage representative of the phase and frequency difference between said burst component and the color reference oscillations coupled across said phase shifting means.

4. The combination according to claim 3 wherein said capacitance includes a fixed capacitor and the capacitance of a shielded cable, said cable coupling said variable resistance to said series combination.

5. The combination according to claim 4 and further comprising a second fixed capacitor exhibiting a relatively high impedance at the frequency of said color reference oscillations coupled between said output terminal of said color reference oscillator and said phase shifting means.

6. The combination according to claim 5 and further comprising color demodulator means coupled to said reference wave output terminal of said color reference oscillator responsive to said modulated color subcarrier component and said reference wave output for deriving image-representative color difference signals from said color subcarrier component, the phase of said reference wave output with respect to the phase of said color burst component being determinative of the color content of said color difference signals.

7. The combination according to claim 6 and further comprising a color killer detector circuit coupled to said burst separating means and to said reference wave output terminal of said color reference oscillator for providing a threshold control signal indicative of the amplitude of said color burst component.

8. The combination according to claim 7 and further comprising fixed phase shifting circuit means coupled to said output terminal for coupling color reference oscillations to said color killer detector circuit.

9. The combination according to claim 6 and further comprising an automatic chrominance control detector circuit coupled to said burst separating means and to said reference wave output terminal of said color reference oscillator for providing a gain control signal dependent upon the amplitude of said color burst component.

References Cited

UNITED STATES PATENTS

| | | | |
|---|---|---|---|
| 2,100,156 | 11/1937 | Buschbeck | 333—29 X |
| 2,881,245 | 4/1959 | Fenton | 178—69.5 X |
| 2,972,013 | 2/1961 | Altes | 178—5.4 |
| 3,085,200 | 4/1963 | Goodall | 325—419 X |
| 3,133,149 | 5/1964 | Inaba | 178—5.4 |
| 3,142,806 | 7/1964 | Fernandez | 329—122 X |
| 3,148,243 | 9/1964 | Wiencek | 178—5.4 |
| 3,286,188 | 11/1966 | Castellano | 325—419 X |

RICHARD MURRAY, *Primary Examiner.*

J. MARTIN, *Assistant Examiner.*